June 16, 1953  W. L. LAWSON  2,641,978
CAMERA SHUTTER MECHANISM WITH SYNCHRONIZER
Filed March 11, 1948  2 Sheets-Sheet 2
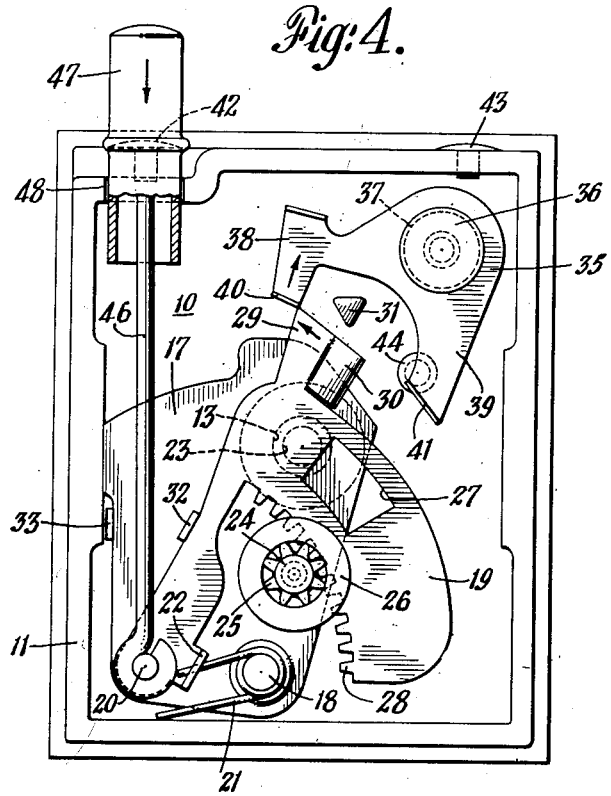
Fig. 4.
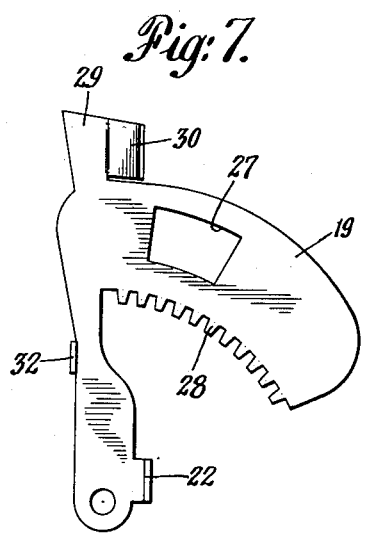
Fig. 7.
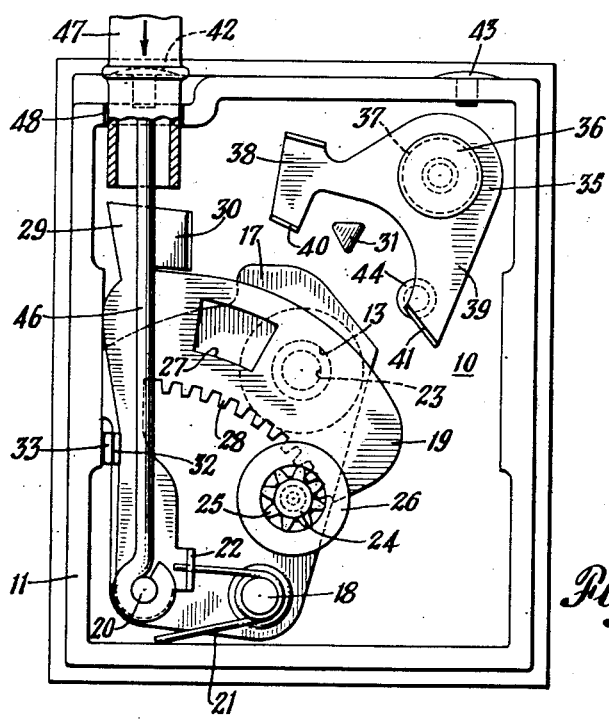
Fig. 5.
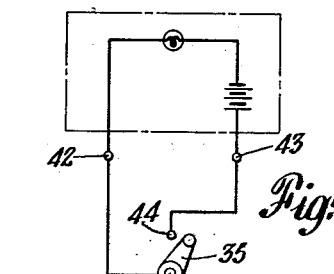
Fig. 8.
Fig. 9.
INVENTOR
WILLIAM L. LAWSON
BY
ATTORNEY Patented June 16, 1953

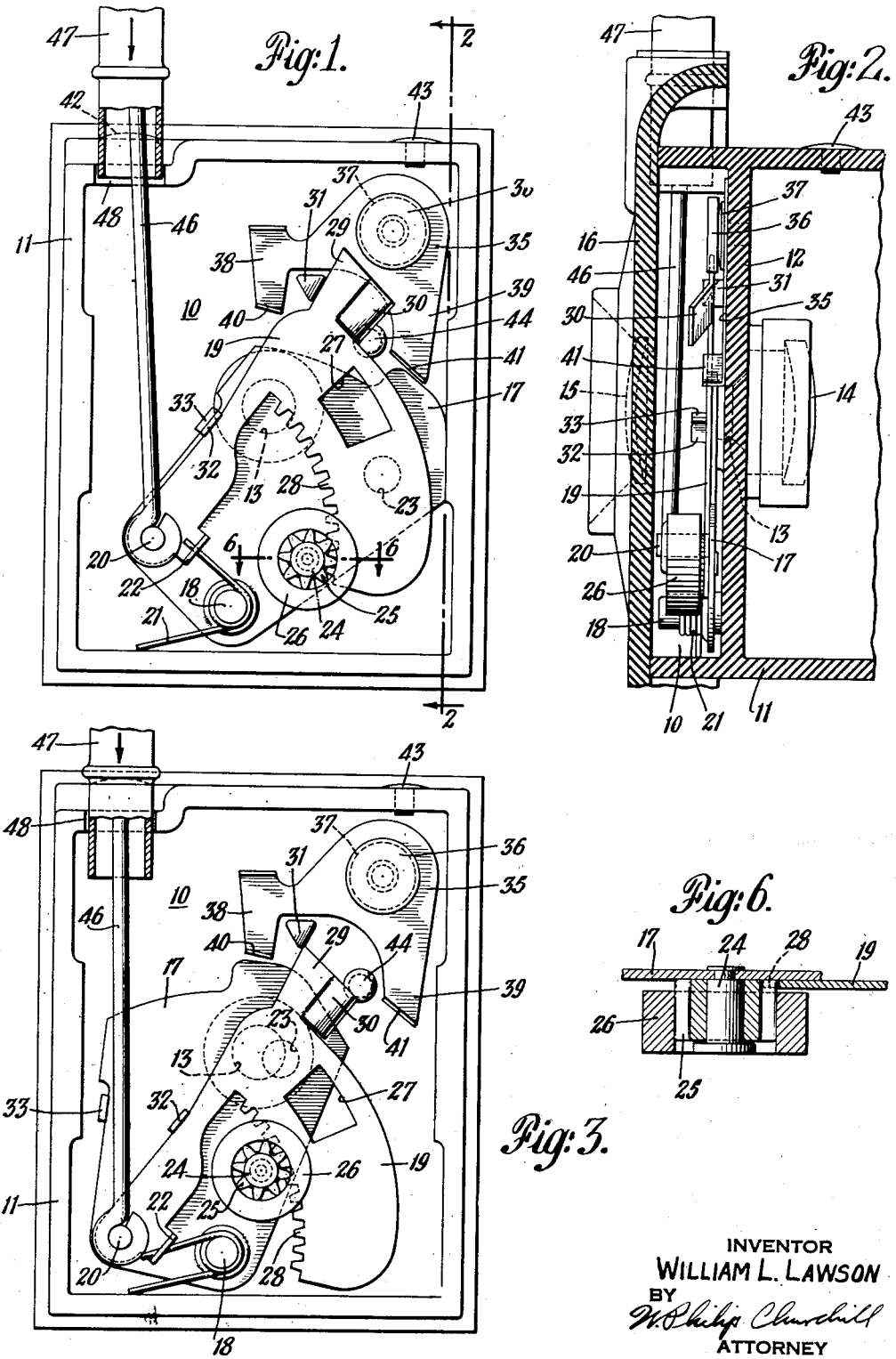

2,641,978

UNITED STATES PATENT OFFICE 2,641,978

CAMERA SHUTTER MECHANISM WITH SYNCHRONIZER

William L. Lawson, Forest Hills, N. Y., assignor to Whitehouse Products, Inc., Brooklyn, N. Y., a corporation of New York Application March 11, 1948, Serial No. 14,301

4 Claims. (Cl. 95—11.5)

This invention relates to a camera shutter mechanism, and more particularly is directed to a shutter mechanism for a camera adapted to take pictures using flash lamps.

Many efforts have been made in the camera field to devise a shutter which will be simple in operation, easy and economical to manufacture and still capable of giving reliable exposures over a long period of time with consistent and controlled exposure speeds. While many shutters have been designed to achieve these objectives, it is frequently found that either they have to be carefully hand made in order to achieve precision, or else they vary considerably in exposure speeds from one camera to another if made by mass production methods.

One object of this invention is to provide a simple camera shutter that can be made by mass production methods and still provide reliable operation for a long period of time with a uniform regulated time of exposure.

A further object of the invention is to provide such a camera shutter for a photoflash camera in which the synchronization of the light from the flash lamp and the exposure of the film are synchronized to produce reliable and consistent results.

Other objects and advantages of my invention will be explained and will be apparent from the following description of a preferred form of my invention shown in the drawings, in which Figure 1 is a front elevational view of a camera shutter constructed in accordance with my invention but with the housing cover plate removed, the shutter being in a position of rest before an exposure is made.

Figure 2 is a transverse sectional view through the camera shutter and housing including the cover plate over the shutter mechanism, and taken approximately on the line 2—2 of Figure 1.

Figure 3 is a view similar to Figure 1, but showing the shutter blades and other parts advanced to a position just before an exposure is made.

Figure 4 is a view similar to Figure 1, but showing the shutter blades and other parts in the position occupied at the approximate instant of starting an exposure.

Figure 5 is a view similar to Figure 1, but showing the shutter blades and other parts in the position occupied immediately after completion of an exposure.

Figure 6 is a fragmentary horizontal sectional view taken approximately on the line 6—6 of Figure 1.

Figure 7 is a front elevational view of the exposure blade of the shutter.

Figure 8 is a front elevational view of the aperture or cover blade of the shutter.

Figure 9 is a diagrammatic wiring diagram showing the connection of the battery and flash lamp to the flash switch in the shutter housing.

Referring particularly to Figure 2, the shutter mechanism is mounted in the front compartment 10 of a shutter housing 11, which may be made of metal, molded plastics or other suitable material, and has a wall 12 provided with a central exposure opening 13. A suitable lens system, such as a lens 14 mounted inside the shutter and the lens 15 mounted in the cover plate 16 for the shutter housing may be provided, the film in the camera being positioned for taking pictures to the right of the lens 14, as seen in Figure 2.

The shutter mechanism is best seen by reference to Figures 1, 3, 4 and 5, showing the mechanism in the housing 11 with the cover or face plate 16 removed. This mechanism may consist of an aperture blade 17 pivotally mounted for rotation about the fixed stud 18 secured in or to the housing wall 12. An exposure blade 19 is pivotally mounted on the stud 20 fixed to the aperture blade 17 at a point laterally offset from the stud 18. A single spring may be used to operate the exposure blade 19 and also to restore both blades to a position of rest after an exposure is made. This may be a simple coil spring 21 mounted on the stud 18, so that one end bears against the lower wall of the shutter housing 11 and the other end is cradled in a notch or opening in the tab 22 formed integral with the shank of the exposure blade 19.

The aperture blade 17 is provided with an opening 23 adapted to register with the opening 13 between the lenses 14 and 15 when the aperture blade is rotated about the stud 18 to the proper position. The aperture blade 17 also has a stud 24 fixed thereto on which is rotatably mounted a small pinion 25 and a flywheel 26 of suitable mass that are forced or pressed together so that they will rotate as a single unit.

The exposure blade is provided with an exposure window 27 and has stamped out an arcuate set of gear teeth 28 adapted to mesh with the pinion 25 as the exposure blade rotates about the stud 20. The outermost end of the exposure blade is formed with a projecting tab 29, the rear portion of which is bent outwardly, as indicated at 30, and which cooperates with a fixed projection 31 on the housing wall 12. In fact, when the housing wall 12 is made of molded plastic, the projection 31 may be readily molded integral therewith. The exposure blade is preferably provided along one side with an outwardly extending tab 32 which cooperates with a similar tab 33 on the aperture blade 17 to limit relative movement of the two blades and make sure that the two blades return together to their position of rest.

A flash switch member 35 may be pivotally mounted on the stud 36 fixed to the shutter housing wall 12 and is preferably restrained in its pivotal movement by a friction or spring washer 37 (see Figure 2) between the head of the stud 36 and the body of the switch member 35. This switch member thus tends to stay in one position until positively moved to a different position. The switch member preferably has two arms 38 and 39, the ends of which are bent to form outwardly projecting tabs 40 and 41, respectively.

The shutter housing is provided with a pair of large headed rivets 42 and 43 mounted in the upper wall of the shutter housing and connected electrically inside the housing to the switch member 35 and the contact member 44. For example, the contact member 44 may be fixed to the wall 12 of the housing 11 in a position to be contacted by the arm 39 of the switch member when this member is rotated clockwise. The contact 44, which may be a simple rivet, is connected electrically by wires or other means (not shown) to the rivet or contact button 43, and the switch member 35 through the stud 36 is connected electrically by wires or other means (not shown) to the rivet or contact button 42.

In the operation of a camera employing this shutter, the battery or other power source and the flash lamp are connected in series with each other and with the contact buttons 42 and 43, as shown in Figure 9. Thus, when the switch arm 35 is moved over the contact 44, a circuit is closed which sets off the flash lamp. Of course, if the housing 11 is constructed of metal or other conducting material, the switch 35, contact member 44 and contact buttons 42 and 43 should be suitably insulated.

The shutter mechanism may be operated by a cable release or any other suitable means such as the rod 46, the lower end of which is pivotally attached over the stud 20 and the upper end of which may be exposed or covered by a cap 47 mounted for vertical reciprocation in a suitable opening 48 in the upper wall of the housing 11.

In the operation of this mechanism, as will be seen by referring to Figures 1, 3, 4 and 5, the parts normally, or in a position of rest, are arranged as shown in Figure 1, with the switch member 35 spaced from the contact member 44 and the two shutter blades 17 and 19 covering the exposure opening 13 in the camera housing and held in this position by the spring 21.

When the rod 46 is moved downward, as by manual pressure on the cap 47, the aperture blade 17 (see Figure 3) is rotated in a counterclockwise direction, compressing the spring 21. The exposure blade 19, however, does not rotate at this stage but by reason of its mounting eccentric to the stud 18 is shifted lengthwise so that the forward edge of the tab 29 slides down along the fixed projection 31. This movement continues until the position in Figure 3 is reached, at which point the tab 29 is just about to slide free of the projection 31. At this stage, the aperture 23 in the aperture blade 17 is approaching but has not quite reached a position concentric with the exposure opening 13 in the camera housing.

As the exposure blade 19 slides free, the aperture blade arrives at the proper position for the exposure, and the tab 29 on the exposure blade strikes the tab 40 on arm 38 of the switch 35, rotating this switch member in a clockwise direction so that its arm 39 slides over and frictionally engages the contact member 44. This position is shown in Figure 4, and completes the circuit to the flash lamp slightly in advance of the passage of the window 27 in the exposure blade over the exposure aperture 13 to expose the film behind it.

This advance completion of the electrical circuit allows the right amount of time interval for the flash lamp to reach its peak light value coincident with the actual exposure. The exposure blade then continues its rotation in a counterclockwise direction, completing the exposure and leaving the switch arm in the closed position as seen in Figure 5.

The rotation of the exposure blade is caused by the spring 21 bearing against the tab 22, and during the exposure, the spring loses some, but not all, of its compression. The gear teeth 28 on the exposure blade during its rotation in a counterclockwise direction about the stud 20 are at all times in engagement with the pinion 25 and causing rotation of the flywheel 26. The mass of this flywheel may be made of the right value to control the speed of the exposure blade so that the time interval between the closing of the flash switch and the exposure and also the time interval for the window 27 to move over the exposure opening are always uniform, accurate and closely controlled. It is not necessary in this arrangement, as it is with so many camera shutters, to provide a spring of exactly the right force. Ordinarily, the strength of the spring determines the speed of operation of the parts, but in this case the strength of the spring is not as critical as usual, and a spring that is strong enough to perform all of the necessary operations can be used with a considerable tolerance in its strength.

The exposure having been completed, the parts return to a position of rest under the influence of the spring 21 as soon as the rod 46 and cap 47 are released. At this stage the tabs 32 and 33 on the two blades 17 and 19 are in contact with each other, thus limiting further relative movement of the two blades so that the force of the spring 21 causes simultaneous rotation of the two blades about the stud 18, returning them to the position of rest shown in Figure 1. As the blades return, the upper inclined edge of the aperture blade 17 strikes the tab 41 of the switch member 35 rotating the switch member in a counterclockwise direction until its arm 39 is free and clear of the contact member 44. By reason of the frictional mounting of the switch arm 35 on the stud 36, the spring arm retains its position until it is positively rotated again by the exposure blade of the shutter to close the switch again. At the same time the inclined portion 30 of tab 29 on blade 19 causes the tab to ride over projection 31 clearing the switch arm 38 and restoring the exposure blade to a position for making the next exposure.

It will be apparent to those skilled in the art that this shutter mechanism is capable of mass production with very consistent results. The two blades may be made by simple stamping operations using thin sheet material such as steel; the pinion and flywheel can be simple die castings fitting together with a press fit; and the parts may be readily mounted or assembled by simple riveting operations. Thus, the entire shutter mechanism is economical to construct as well as positive and consistent in its operation. Only one spring is needed for the entire mechanism and the exact strength of this spring is not critical.

In addition, the flash switch unit is positive in operation and not likely to become fouled by corrosion because of the positive and continuous frictional engagement that the switch arm 39 makes with the contact member 44. This is of substantial advantage compared with switch members that rely upon a spring element or upon a momentary wiping contact for completing the electrical circuit.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a camera shutter mechanism, a housing having an exposure opening therein, a blade pivotally mounted in the housing and having an aperture that registers with said opening when the blade is rotated from its normal position of rest, an exposure blade pivotally mounted on said first blade for making an exposure when rotated in the same direction following rotation of said first blade from its rest position, a flash switch member mounted in said housing for pivotal movement, an electric contact disposed in the path of movement of said member so as to make a sliding contact therewith upon rotation of the member, said switch member having a portion engaged by said exposure blade at the start of its rotation to make an exposure and to rotate the switch member into engagement with said contact, and said switch member having another portion engaged by one of said blades to return the member to its original position when the blades return to their rest position.

2. In a camera shutter mechanism, a housing having an exposure opening therein, a blade pivotally mounted in the housing and having an aperture that registers with said opening when the blade is rotated from its normal position of rest, on exposure blade pivotally mounted on said first blade for making an exposure when rotated in the same direction following rotation of said first blade from its rest position, spring means for rotating said exposure blade to make an exposure, a flywheel for regulating the speed of said exposure blade when rotated by said spring means, a flash switch member mounted in said housing for pivotal movement, an electric contact disposed in the path of movement of said member so as to make a sliding contact therewith upon rotation of the member, said switch member having a portion engaged by said exposure blade at the start of its rotation to make an exposure and to rotate the switch member into engagement with said contact, and said switch member having another portion engaged by one of said blades to return the member to its original position when the blades return to their rest position.

3. A camera shutter mechanism which comprises a housing having a lens opening therein, an aperture blade pivotally mounted in said housing for rotation from a position of rest covering said opening to an exposure position uncovering said opening, an exposure blade eccentrically and pivotally mounted on said aperture blade so that the exposure blade pivot is moved away from said opening as the aperture blade is rotated toward its exposure position, a latch engaging an outer portion of the exposure blade to restrain pivotal movement thereof only until the aperture blade reaches exposure position, spring means for rotating said exposure blade when released by said latch to expose said opening, an operating member for rotating said aperture blade to its exposure position, a flywheel to regulate the speed of rotation of said exposure blade after release by said latch, a fixed electrical contact, and a flash switch member pivotally mounted in the housing for rotation from one position to another position in sliding engagement with said contact, said member having a portion engaged by said exposure blade after release by said latch to rotate said member into said engaging position, and said member being returned to its original position by one of said blades when the blades are returned to their rest position.

4. A camera shutter mechanism as defined in claim 3 in which the flywheel is pivotally mounted on the aperture blade, and the exposure blade has teeth formed therein to provide an arcuate rack engaging a pinion on the flywheel.

WILLIAM L. LAWSON.

References Cited in the file of this patent

UNITED STATES PATENTS

| Number | Name | Date |
|---|---|---|
| 1,867,109 | Seifert | July 12, 1932 |
| 2,191,402 | Saffier et al. | Feb. 20, 1940 |
| 2,196,604 | Galter | Apr. 9, 1940 |
| 2,206,811 | Drotning et al. | July 2, 1940 |
| 2,252,688 | Blank | Aug. 19, 1941 |
| 2,282,850 | Brownscombe | May 12, 1942 |
| 2,298,382 | Hutchison et al. | Oct. 13, 1942 |
| 2,326,077 | Steiner | Aug. 3, 1943 |
| 2,384,639 | Riddell | Sept. 11, 1945 |
| 2,443,208 | Thralls | June 15, 1948 |
| 2,453,321 | Hutchison | Nov. 9, 1948 |
| 2,478,309 | Pask et al. | Aug. 9, 1949 |
| 2,498,277 | Kaplowitz | Feb. 21, 1950 |
| 2,498,279 | Kaplowitz | Feb. 21, 1950 |
| 2,575,121 | Perwitz et al. | Nov. 13, 1951 |